(12) United States Patent
Brees

(10) Patent No.: US 7,533,525 B2
(45) Date of Patent: May 19, 2009

(54) HYDRODYNAMIC TORQUE CONVERTER

(75) Inventor: William Brees, Wooster, OH (US)

(73) Assignee: LuK Lamellen und Kupplungsbau Beteiligungs KG, Buehl (DE)

( * ) Notice: Subject to any disclaimer, the term of this patent is extended or adjusted under 35 U.S.C. 154(b) by 370 days.

(21) Appl. No.: 11/448,443

(22) Filed: Jun. 7, 2006

(65) Prior Publication Data

US 2006/0277903 A1    Dec. 14, 2006

Related U.S. Application Data

(60) Provisional application No. 60/689,756, filed on Jun. 10, 2005.

(51) Int. Cl.
*F16D 33/00*    (2006.01)
(52) U.S. Cl. .............................. 60/330; 60/347; 60/352; 60/354; 60/355; 60/356
(58) Field of Classification Search .................. 60/330, 60/347, 352, 354, 355, 356
See application file for complete search history.

(56) References Cited

U.S. PATENT DOCUMENTS

| 2,755,628 | A | * | 7/1956 | Mamo | 60/356 |
| 2,929,267 | A | * | 3/1960 | Wilson | 60/354 |
| 3,120,763 | A | * | 2/1964 | Shuster | 477/97 |
| 3,645,351 | A | * | 2/1972 | Muller | 60/354 |
| 4,009,571 | A | * | 3/1977 | Black et al. | 60/354 |
| 4,047,383 | A | * | 9/1977 | Johnson et al. | 60/354 |
| 4,377,068 | A | * | 3/1983 | Braatz | 60/342 |
| 4,964,843 | A | * | 10/1990 | Wahl | 475/34 |
| 5,307,629 | A | * | 5/1994 | By et al. | 60/342 |

* cited by examiner

*Primary Examiner*—Igor Kershteyn
(74) *Attorney, Agent, or Firm*—Simpson & Simpson, PLLC

(57) ABSTRACT

The invention relates to a hydrodynamic torque converter comprising a driving pump wheel, a driven turbine wheel, and a guide wheel, which has guide wheel blades. In order to create a hydrodynamic torque converter, which requires less installation space than conventional torque converters and is producible cost-effectively, the guide wheel blades are attached to the guide wheel such that they can move between a throughflow position and a guide position.

13 Claims, 2 Drawing Sheets

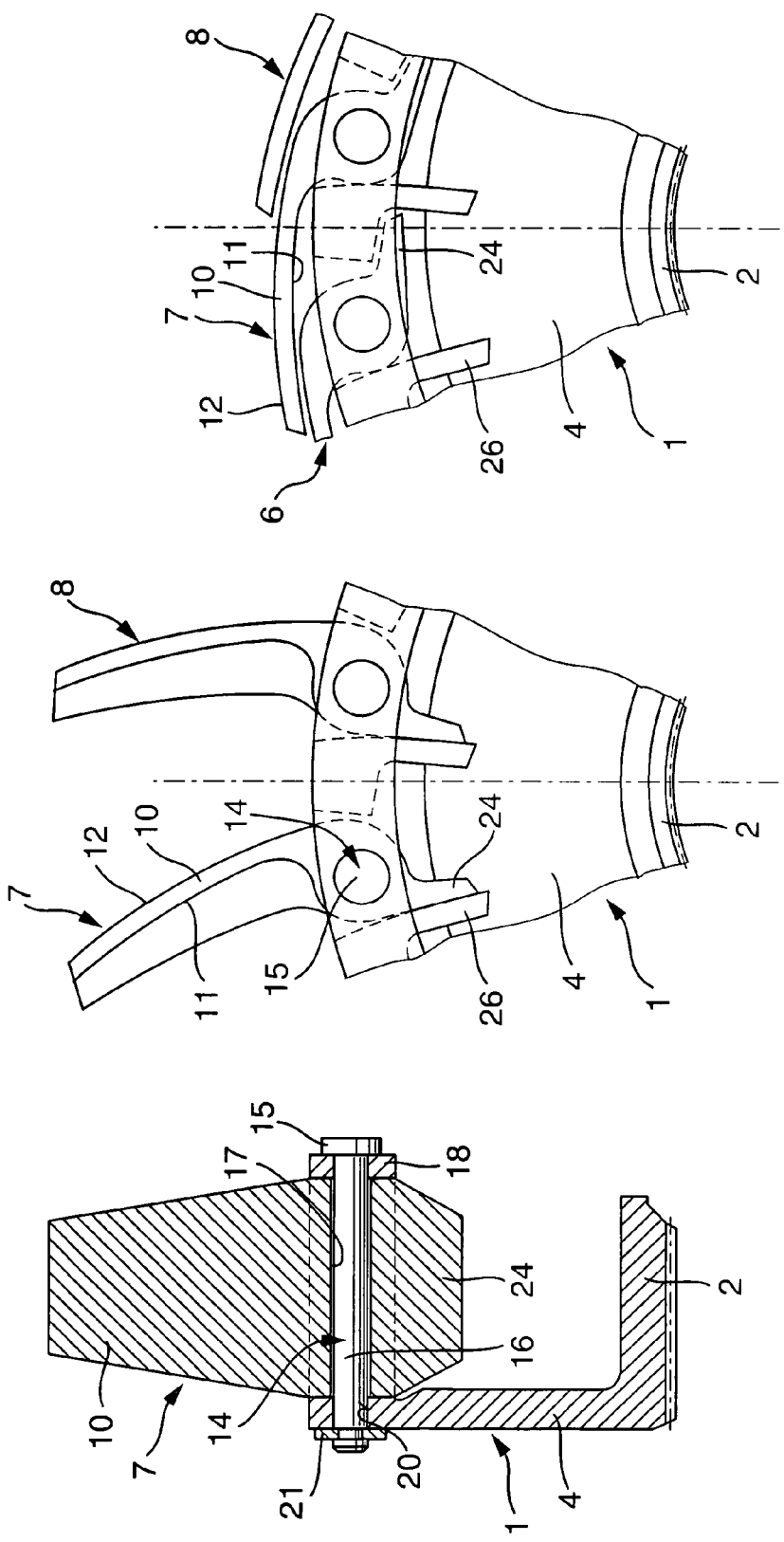

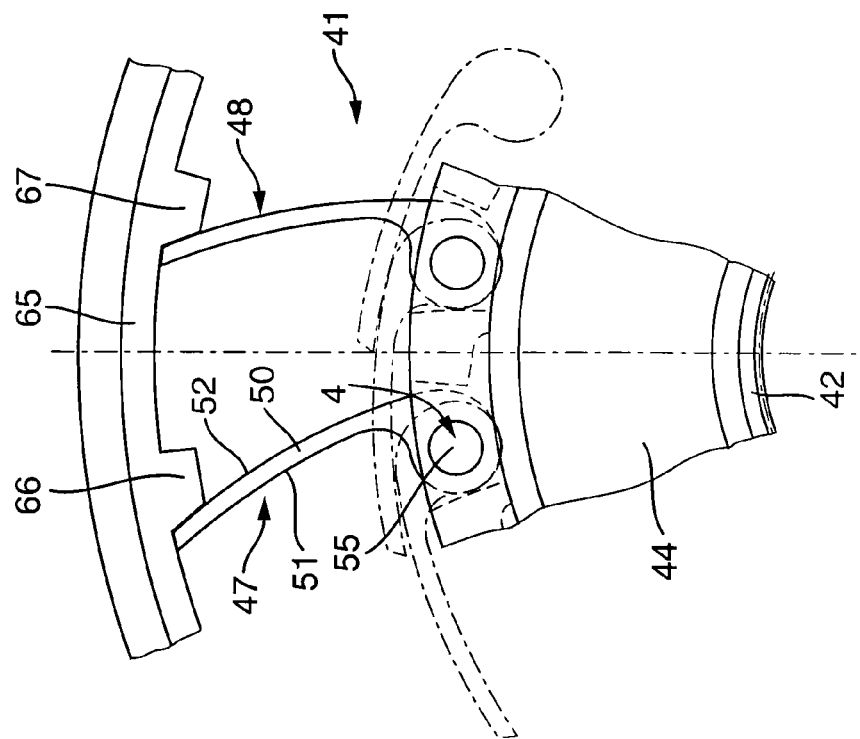
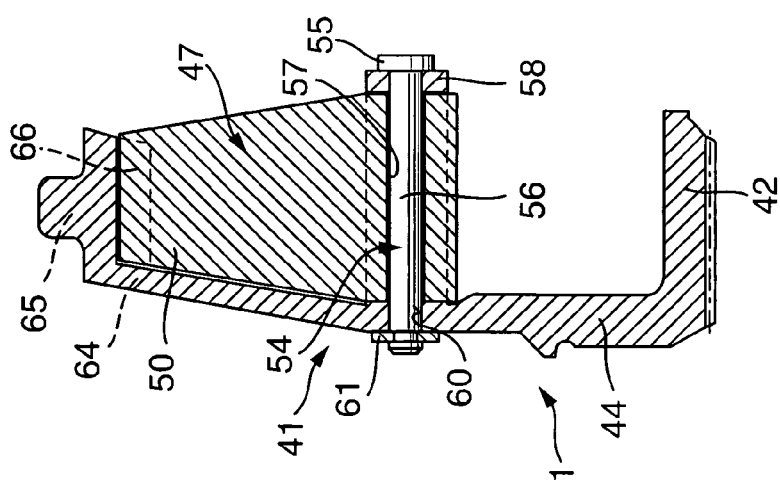
Fig. 5
Fig. 4

HYDRODYNAMIC TORQUE CONVERTER

CROSS REFERENCE TO RELATED APPLICATIONS

This patent application claims the benefit under 35 U.S.C. §119(e) of U.S. Provisional Application No. 60/689,756, filed Jun. 10, 2005, which application is incorporated herein by reference.

FIELD OF THE INVENTION

The invention relates to a hydrodynamic torque converter comprising a driving pump wheel, a driven turbine wheel, and a guide wheel, which comprises the guide wheel blades.

BACKGROUND OF THE INVENTION

In conventional hydrodynamic torque converters, the guide wheel is supported rotatably in one direction of rotation. The other direction of rotation is blocked by a freewheel in order to prevent the guide wheel from twisting against the direction of rotation of the pump wheel and the turbine wheel. A medium stream delivered from the pump wheel via the turbine wheel is supported against the guide wheel blades of the guide wheel blocked by the freewheel. If the pump wheel and the turbine wheel have approximately the same speed, then the direction of the medium stream changes such that it flows towards the guide wheel blades from the rear side and the guide wheel starts to rotate along.

SUMMARY OF THE INVENTION

It is the object of the invention to create a hydrodynamic torque converter comprising a driving pump wheel, a driven turbine wheel and a guide wheel, which comprises guide wheel blades, wherein said hydrodynamic torque converter requires less installation space as compared to conventional torque converters and is producible cost-effectively.

The object is attained in a hydrodynamic torque converter comprising a driving pump wheel, a driven turbine wheel and a guide wheel, which comprises guide wheel blades, by attaching the guide wheel blades to the guide wheel such that they can move between a throughflow position and a guide position. In the guide position, a medium stream delivered from the pump wheel via the turbine wheel is supported against the guide wheel blades. This brings about a backpressure, which results in increasing the rotary force of the blades of the turbine wheel. The medium stream is guided from the guide wheel blades at an advantageous angle back to the blades of the pump wheel. If the pump wheel and the turbine wheel have approximately the same speed, then the direction of the medium stream changes such that it flows towards the guide wheel blades in another direction, for example, towards their rear side. Due to the incident flow from the other direction, the guide wheel blades move from their guide position into their throughflow position, in which they enable an unobstructed medium flow through the guide wheel. The rotatable bearing of the guide wheel and the freewheel can be omitted.

A preferred embodiment of the torque converter includes a guide wheel that is stationary in relation to the pump wheel and the turbine wheel. The guide wheel is fixed, for example, to a stationary housing structure or to a fixed supporting structure of a motor vehicle.

In another preferred embodiment of the torque converter, the guide wheel blades are supported on the guide wheel such that they can swivel between the throughflow position and the guide position. The bearing of the guide wheel blades is implemented, for example, with the help of pins, which are fixed to the guide wheel.

In another embodiment of the torque converter, the guide wheel comprises an inner ring, from which a flange stretches radially outwards, on the radially outer area of which the guide wheel blades are swivelably supported. The bearing of the guide wheel blades is implemented, for example, with the help of pins, which are fixed to the flange.

In another embodiment of the torque converter, the flange includes a limit stop for a foot, which runs from the associated guide wheel blade. The limit stops serve for fixing the guide wheel blades in their guide position.

In another preferred embodiment of the torque converter, the guide wheel comprises an outer ring, which is connected to the flange using connecting webs. This increases the stability of the guide wheel.

Another preferred embodiment of the torque converter includes one limit stop for each guide wheel blade on the outer ring. The limit stops serve for fixing the guide wheel blades in their guide position.

Another preferred embodiment of the torque converter is arranged such that the guide wheel blades rest against one another in their throughflow position. The guide wheel blades are preferably arranged in their throughflow position in the peripheral direction of the flange in order to enable an unobstructed passage of the medium stream.

BRIEF DESCRIPTION OF THE DRAWINGS

Additional advantages, features and details of the invention are specified in the following description, in which different example embodiments are described in detail with reference to the drawing. The features mentioned in the claims and in the description can thereby be essential to the invention either individually or in any combination thereof. The drawing illustrates:

FIG. 1 illustrates the view of a section through a guide wheel according to a first embodiment;

FIG. 2 illustrates the top view of a section of the guide wheel shown in FIG. 1, wherein the guide wheel blades are located in their guide position;

FIG. 3 illustrates the same view as in FIG. 2 of the guide wheel shown in FIG. 1, wherein the guide wheel blades are located in their throughflow position;

FIG. 4 illustrates the view of a section through a guide wheel according to a second embodiment; and, FIG. 5 illustrates a top view of a section of the guide wheel shown in FIG. 4.

DETAILED DESCRIPTION OF THE INVENTION

The invention relates to a hydrodynamic torque converter. The hydrodynamic torque converter is combined with a planetary gear in an automatic gearbox of a motor vehicle. It replaces a mechanical friction coupling as a starting clutch and expands, as a dynamic torque converter, the transmission ratio range of the planetary gear connected downstream. The hydrodynamic torque converter comprises a pump wheel driving at motor rotation speed, a driven turbine wheel, and a guide wheel. The pump wheel, turbine wheel, and the guide wheel are embodied as bent blade wheels and run in a closed housing filled with hydraulic oil.

FIGS. 1 to 3 illustrate a guide wheel 1 in different views and positions thereof. The guide wheel 1 comprises an inner ring 2, which substantially has the shape of a hollow circular cylinder. The inner ring 2 serves for fixing the guide wheel 1 to a suitable supporting structure. A flange 4 stretches radially outwards from the inner ring 2. Guide wheel blades 6, 7, 8 are swivelably supported on the radially outer area of the flange 4.

The structure of the guide wheel blades is explained in the following on the basis of the guide wheel 7 by way of example. The guide wheel blade 7 comprises a blade body 10, which is designed with a bent shape and a front side 11 and also a rear side 12. The guide wheel blade 7 is swivelably supported on the flange 4 with the help of a pin 14. The pin 14 comprises a head 15, from which a bolt 16 runs. The bolt 16 stretches through a throughhole 17, which is cut out in the guide wheel blade 7. A bearing disk 18 is arranged between the head 15 of the pin 14 and the guide wheel blade 7. Furthermore, the bolt 16 of the pin 14 stretches through a throughhole 20, which is cut out in the radially outer area of the flange 4. The end of the bolt 16, said end opposing to the head 15 of the pin 14, protrudes over the flange 4 on the side of the flange 4, said side being turned away from the guide wheel blade 7. The pin 14 is fixed to the flange 4 of the guide wheel 1 in the axial direction with the help of a retaining ring 21.

On its side opposite to the blade body 10, the guide wheel blade 7 comprises a foot 24. In the guide position of the guide wheel blade 7 illustrated in FIG. 2, the foot 24 rests against a limit stop 26, which is fixed to the flange 4 of the guide wheel 1. The limit stop 26 prevents an additional twist of the blade body 10 if the medium stream flows towards the front side 11 of the blade body 10. If the medium stream flows towards the blade body 10 from its rear side 12, then the blade body 10 deviates from the guide position illustrated in FIG. 2 into its throughflow position shown in FIG. 3. In said throughflow position, the guide wheel blade 7 rests against the adjoining guide wheel blade 6. Similarly, the guide wheel blade 8 rests against the guide wheel blade 7 in the throughflow position.

FIGS. 4 and 5 illustrate different views of a guide wheel 41 according to another embodiment. The guide wheel 41 comprises an inner ring 42, from which a flange 44 stretches radially outwards. Guide wheel blades 47, 48 are swivelably supported on the radially outer area of the flange 44.

The structure of the guide wheel blades is explained in the following on the basis of the guide wheel blade 47 by way of example. The guide wheel blade 47 has a bent blade body 50 with a front side 51 and a rear side 52. The guide wheel blade 47 is swivelably attached to the flange 44 of the guide wheel 41 with the help of a pin 54. The pin 54 comprises a head 55, from which a bolt 56 runs. The bolt 56 stretches through a throughhole 57, which is cut out in the guide wheel blade 47. A bearing disk 58 is arranged between the head 55 of the pin 54 and the guide wheel blade 47. The end of the bolt 56, the end being turned away from the head 55, is inserted through a throughhole 60, which is cut out in the radially outer area of the flange 44 of the guide wheel 41. The end of the pin 54, the end being turned away from the head 55, is fixed to the flange 44 of the guide wheel 41 in the axial direction with the help of a retaining ring 61.

A connecting web 64 stretches radially outwards from the flange 44 of the guide wheel 41. The connecting web 64 and other connecting webs (not illustrated) stretch in the radial direction between the flange 44 and an outer ring 65, which is arranged coaxially or concentrically to the inner ring 42. Limit stops 66, 67 for the guide wheel blades 47, 48 are provided in the radially inner area of the outer ring 65. The limit stops 66, 67 prevent the guide wheel blades 47, 48 from twisting in the clockwise direction beyond the position illustrated in FIG. 5. Due to the limit stops 66 and 67, the guide wheel blades 47 and 48 are fixed in their guide position if the medium stream flows towards their front side 51. If the medium stream flows towards the rear side 52 of the guide wheel blade 47, then the latter moves out of the guide position illustrated using continuous lines into the throughflow position indicated by the dashed line. In the throughfow position, the guide wheel blades partially rest against one another. In addition, the guide wheel blades are substantially arranged in the peripheral direction in the throughflow position indicated by the dashed line.

During start-up, the oil located between the blades of the pump wheel flows outwards due to the centrifugal force, is deflected and hits on the blades of the stopped turbine wheel. The kinetic energy of the oil stream is converted into a rotary force. The turbine wheel starts to rotate and delivers kinetic energy to the planetary gear connected downstream. The oil emerging from the turbine wheel against the direction of rotation now hits on the guide wheel and is supported against the blades of the guide wheel, said blades being bent opposite to the pump wheel and the turbine wheel and could turn the guide wheel against the direction of rotation of the pump wheel and the turbine wheel. The oil is now supported against the guide wheel blades, which are located in their guide position and rest against the associated limit stops. This brings about a strong backpressure, which results in increasing the rotary force of the blades of the turbine wheel. The oil stream is guided using the guide wheel blades at an advantageous angle back towards the blades of the pump wheel.

The higher the speed of the turbine wheel, the smaller is the speed difference between the pump wheel and the turbine wheel. The oil stream now impinges on the guide wheel blades at another angle. This reduces the support force and thus the additional force on the blades of the turbine wheel. Should the pump wheel and the turbine wheel have approximately the same speed, the direction of the oil stream changes. The oil stream now flows towards the guide wheel blades from their rear side and the latter deviate from their guide position into their throughflow position. There is no more dynamic pressure. No additional rotary force acts on the turbine wheel. Therefore no more torque multiplication will take place. The torque converter then functions as a hydrodynamic coupling.

LIST OF REFERENCE NUMERALS

1 Guide wheel
2 Inner ring
4 Flange
6 Guide wheel blade
7 Guide wheel blade
8 Guide wheel blade
10 Blade body
11 front side
12 Rear side
14 Pin
15 Head
16 Bolt
20 Throughhole
18 Bearing disk
20 Throughhole
21 Retaining ring
24 Foot
26 Limit stop
41 Guide wheel
42 Inner ring
44 Flange
47 Guide wheel blade
48 Guide wheel blade
50 Blade body 51 Front side
52 Rear side
54 Pin
55 Head
56 Bolt
57 Throughhole
58 Bearing disk
60 Throughhole
61 Retaining ring
64 Connecting web
65 Outer ring
66 Limit stop
67 Limit stop

What is claimed is:

1. A hydrodynamic torque converter comprising a driving pump wheel, a driven turbine wheel and a guide wheel (1; 41), which has guide wheel blades (6-8; 47, 48), said hydrodynamic torque converter being characterized in that the guide wheel blades (6-8; 47, 48) are attached to the guide wheel (1; 41) such that they can move between a throughflow position and a guide position, and wherein the blades are operatively arranged so that the blades pivot from the throughflow position to the guide position as a result of a medium stream in the torque converter directly acting against a front surface (11) of the blades, and the blades pivot from the guide position to the throughflow position by the medium stream directly acting against a rear surface (12) of the blades, and wherein the medium stream is unobstructed by the blades when the blades are arranged in the throughflow position.

2. The hydrodynamic torque converter according to claim 1, wherein the guide wheel (1; 41) is stationary relative to the pump wheel and the turbine wheel.

3. The hydrodynamic torque converter according to claim 1, wherein the guide wheel blades (6-8; 47, 48) are supported on the guide wheel (1; 41) such that they can swivel between the throughflow position and the guide position.

4. The hydrodynamic torque converter according to claim 3, wherein the guide wheel (1; 41) comprises an inner ring (2; 42) from which a flange (4; 44) stretches radially outwards, on the radially outer area of which the guide wheel blades (6-8; 47, 48) are swivelably supported.

5. The hydrodynamic torque converter according to claim 4, wherein the flange (4) includes a limit stop (26) for a foot (24), and wherein the foot runs from the associated guide wheel blade (7).

6. The hydrodynamic torque converter according to claim 4, wherein the guide wheel (41) comprises an outer ring (65), which is connected to the flange (44) using connecting webs (64).

7. The hydrodynamic torque converter according to claim 6, wherein one limit stop (66, 67) for each guide wheel blade (47, 48) is provided on the outer ring (65).

8. The hydrodynamic torque converter according to claim 1, wherein the guide wheel blades (6-8; 47, 48) rest against one another in their throughflow position.

9. A hydrodynamic torque converter comprising:
a driving pump wheel, a driven turbine wheel and a guide wheel (1; 41), which has guide wheel blades (6-8; 47, 48), said hydrodynamic torque converter being characterized in that the guide wheel blades (6-8; 47, 48) are attached to the guide wheel (1; 41) such that they can move between a throughflow position and a guide position;
wherein the guide wheel blades (6-8; 47, 48) are supported on the guide wheel (1; 41) such that they can swivel between the throughflow position and the guide position;
wherein the guide wheel (1; 41) comprises an inner ring (2; 42) from which a flange (4; 44) stretches radially outwards, on the radially outer area of which the guide wheel blades (6-8; 47, 48) are swivelably supported; and,
wherein the flange (4) includes a limit stop (26) for a foot (24), and wherein the foot runs from the associated guide wheel blade (7).

10. The hydrodynamic torque converter according to claim 9, wherein the guide wheel (1; 41) is stationary relative to the pump wheel and the turbine wheel.

11. The hydrodynamic torque converter according to claim 9, wherein the guide wheel (41) comprises an outer ring (65), which is connected to the flange (44) using connecting webs (64).

12. The hydrodynamic torque converter according to claim 11, wherein one limit stop (66, 67) for each guide wheel blade (47, 48) is provided on the outer ring (65).

13. The hydrodynamic torque converter according to claim 9, wherein the guide wheel blades (6-8; 47, 48) rest against one another in their throughflow position.

* * * * *